United States Patent Office 2,758,098
Patented Aug. 7, 1956

2,758,098

REGENERATION OF PLATINUM-CONTAINING AROMATIZING CATALYSTS

Vladimir Haensel, Hinsdale, Ill., assignor to Universal Oil Products Company, Chicago, Ill., a corporation of Delaware No Drawing. Application June 18, 1952,
Serial No. 294,271

4 Claims. (Cl. 252—416)

This invention relates to an improved method for the regeneration or reactivation of catalysts and more particularly to the regeneration or reactivation of catalysts which have been rendered more or less inactive as a result of use in hydrocarbon conversion processes.

The present invention is particularly applicable to the reactivation of catalysts of group VIII of the periodic table. The novel features of the present invention are particularly adapted to the reactivation of platinum-containing catalysts and the following description will be directed primarily to the treatment of such catalysts, with the understanding that the process may be utilized for the reactivation or regeneration of other catalysts as herein set forth but not necessarily with equivalent results.

Platinum-containing catalysts are utilized in many conversion reactions. During the course of the conversion reaction, carbonaceous materials become deposited upon the catalysts and deactivate the catalysts activity for effecting the desired conversion. The carbon or carbonaceous material deposited on the catalysts will hereinafter be referred to as carbon. A particularly suitable catalyst for use in the reforming of gasoline or gasoline fractions comprises alumina, from about 0.01% to about 1% by weight of platinum and from about 0.1% to about 8% by weight of halogen. This catalyst, as well as other hydrocarbon conversion catalysts, has the ability to promote the conversion of particular hydrocarbons into aromatics and this activity will herein be referred to as the aromatic power-producing activity of the catalyst. One of the activities of the catalyst in reference to this aromatic power-producing activity is usually referred to as the aromatizing or dehydrogenating activity. In this reaction, the six-membered ring compounds are dehydrogenated to the corresponding aromatics. Another activity of the catalyst is usually referred to as the dehydrocyclizing activity of the catalyst in which straight-chain or slightly branched-chain paraffins are dehydrogenated and dehydrocyclized to form aromatics. Present with these activities is an isomerization activity which, along with the dehydrogenation activities of the catalyst, produce aromatics from five-membered ring paraffins, an example of which is the conversion of methylcyclopentane to benzene. The isomerizing activity is also evidenced in other types of reactions such as in the conversion of ethylcyclohexane to any one of the three xylenes.

My invention relates to the regeneration of catalysts by treating said catalysts with carbon dioxide at elevated temperatures so as to substantially restore the aromatic power-producing activity of the catalyst.

My invention is particularly suitable for restoring the activity of reforming catalysts. The term "reforming" is well known in the art and refers to the treatment of gasoline or gasoline fractions as the naphtha fraction to improve the antiknock characteristics thereof. The specific catalyst hereinabove mentioned which comprises platinum-alumina-halogen may be used in the reforming process for relatively long periods of time without substantial loss of catalyst activity. For this reason, the process is generally considered as a non-regenerative process. However, after very long periods of time, the catalyst does become deactivated and eventually requires reactivating.

In the reforming operation various reactions occur including hydrocracking, dehydrogenation, dehydrocyclization, isomerization, desulfurization, etc. As a result of the cracking, the catalyst becomes coated with a carbon deposit. When using this catalyst for reactions such as dehydrogenation, dehydrocyclization, desulfurization, etc., best results are sometimes obtained when higher temperatures are utilized. When higher temperatures are utilized in these reactions, some cracking also takes place and as a result of this cracking, the catalyst becomes coated with a carbon deposit. It is found, however, that the activity of the catalyst for reactions such as dehydrogenation, dehydrocyclization and isomerization is not directly related to the amount of carbon deposited on the catalyst. In the preferred modes of operation of the process of my invention, these aforementioned activities are substantially restored and the carbon content of the catalyst is simultaneously reduced. However, the degree of carbon reduction on the catalyst is not a measure of the restoration of the aforementioned activities as will be hereinafter disclosed.

It has been proposed heretofore to remove the carbon deposit from the catalyst by contacting the catalyst with air at elevated temperatures within the range of from about 750° F. to 1000° F. to effect the oxidation of carbon to carbon dioxide. In these proposed regenerative processes, severe damage may be done to the catalytic materials due to the uncontrolled combustion of the carbonaceous material which is a highly exothermic reaction. High temperatures in the presence of oxygen may produce highly deleterious effects, such as the increase of crystal size of the active metal component which will produce a less active surface of the metal component of the catalyst. One of the inherent disadvantages of using oxygen for the regeneration of catalysts is that the reaction is highly exothermic and "hot spots" frequently develop which when formed tend to spread rapidly and beyond control, to the detriment of the catalyst being subjected to these unusually high temperatures.

In one embodiment, the present invention relates to a method of regenerating a catalyst containing a metal of group VIII of the periodic table which comprises treating said catalyst with carbon dioxide at a temperature of from about 1100° F. to about 1400° F. for a period of from about one to about 48 hours.

In accordance with the present invention, the catalyst is periodically but infrequently contacted with carbon dioxide at temperatures in the range of from about 1100° F. to about 1400° F. and preferably from about 1150° F. to about 1250° F. for a period of time such that the activity of the catalyst is appreciably restored. The reactivation which is accomplished in the present reaction is not exclusively the result of carbon removal since it is not possible to correlate the degree of restoration of activity of the catalyst, especially in reference to the aromatic-producing power activity of the catalyst, with the reduction of carbon content of the catalyst. The reactivation of the aromatic-producing power of the catalyst seems to be related to a change in the oxidation state of the active components of the catalyst or the contaminants present therein. This fact shows that the method of regeneration used in my invention is unlike the type of regeneration that is heretofore performed on catalysts such as cracking catalysts or hydroforming catalysts in which the activities of regeneration can be related directly to the extent of carbon reduction.

In reforming operations, it has also been noticed that the aromatic-producing power of the catalyst is decreased, whereas the hydrocracking activity remains at substantially the same level. By hydrocracking activity is meant the ability of the catalyst to promote the conversion of heavier straight-chain or slightly branched-chain paraffins, which have low antiknock characteristics, into lighter straight-chain or slightly branched-chain paraffins which have higher antiknock characteristics. The method of reactivation in my invention is thus particularly suitable for catalysts used in reforming operations since the reactivation is selective in that the aromatic-producing activities are appreciably increased during the reactivation, the hydrocracking activity is largely unaffected or may even be decreased.

In one embodiment the present invention relates to a method of regeneration of platinum-containing catalysts which comprises treating said catalyst with carbon dioxide at a temperature of from about 1100° F. to about 1400° F. for at least one hour.

In a specific embodiment the present invention relates to a method of regenerating a catalyst comprising alumina, from about 0.01% to about 1% by weight of platinum and from about 0.1% to about 8% by weight of combined halogen which comprises treating said catalyst with carbon dioxide at a temperature of from about 1100° F. to about 1400° F. for a period of from about one to about 48 hours.

The time of treatment is at least one hour and still more particularly is within the range of from about two to about 48 hours or more. It is understood that the temperature and time will be correlated to produce the desired results. The temperature and time are inversely related and when employing higher temperatures within the range specified shorter times will be employed and conversely when employing lower temperatures longer periods of reactivation will be utilized.

During use of conversion processes, a modification of the platinum occurs and during the reactivation of the catalyst, in accordance with procedure of this invention, it is believed that the platinum is reoriented which may include a change in the state of the platinum back to that existing in the fresh catalyst. It may be that, due to continuous exposure to a reducing atmosphere, particularly to one containing appreciable amounts of hydrogen sulfide, there is some migration or rearrangement of platinum on the catalyst which would tend to be harmful. However, it is understood that I do not intend to be limited to this explanation. Whatever the mechanisms of deactivation of the catalyst besides the depositing of coke on the surface of the catalyst, the aromatic-producing power is substantially restored when the process of my invention is employed for regeneration.

As hereinbefore noted the novel features of the present invention are particularly adapted for the reactivation of platinum-containing catalysts and more particularly catalysts comprising alumina and platinum which have become deactivated during use in the reforming of gasoline.

During use in reforming processes and also in other processes, the catalyst may become coated with a scale of iron oxide or other metallic oxide constituent. In general, it has been found that catalysts treated in the above manner may be regenerated according to the process of my invention without removal of the metallic coating. However, it is within the scope of the invention to remove the coating in any suitable manner such as by air blowing, attrition, agitation, etc.

The catalyst may be present in any suitable particle size for reactivation in accordance with the present invention. Usually the catalyst will be in the shape of cylinders or spheres of uniform size by pelleting, extrusion or other suitable methods and these particles may be treated in accordance with the present invention. Catalysts in a highly divided state such as may be used in a fluidized type of operation may also be reactivated in accordance with the present invention.

From the hereinabove description it is apparent that the reactivation of platinum-containing catalysts requires a special treatment. High temperatures are particularly to be avoided and care must be exercised in performing the reactivation of the catalyst to insure a uniform temperature throughout the reactivation zone. As was hereinbefore mentioned, in reactivation processes where oxygen is used as the reactivating gas, the reaction is highly exothermic and there is present the inherent danger of overheating the catalyst and destruction of the catalytic properties of the catalyst. The process of my invention is preferable since the main reaction in the reactivation process is the conversion of carbon to carbon monoxide in the presence of carbon dioxide according to the equation: $2C+CO_2=CO$, which reaction is endothermic. Due to the endothermicity of this reaction, it is not necessary to as carefully supervise the reactivation as when oxygen is used as the reactivating gas, however, due to the endothermicity of the reaction, heat must be supplied to the reaction zone to maintain the catalyst at the desired regeneration temperature.

The gas used for the regeneration comprises carbon dioxide. Pure carbon dioxide may be used to effect the regeneration of the catalyst, however, it is possible to use other carbon dioxide-containing gases such as a flue gas provided the gas has a sufficiently high percentage of carbon dioxide, which generally is at least 10%, and the other components of the gas are inert with respect to reacting with the catalyst at the elevated temperatures. It is also preferred that if a gas other than pure carbon dioxide is employed that the gas contain relatively insignificant amounts of oxygen generally below about 0.02% to insure against the development of uncontrolled combustion in the reaction zone.

In one embodiment of the regeneration, a low carbon dioxide-containing gas may be passed over the catalyst at substantially room temperature and the temperature in the reactivation zone may be slowly increased while at the same time increasing the per cent of carbon dioxide until the desired regeneration temperature is attained and essentially pure carbon dioxide is used for the regeneration. Since the supplies of carbon dioxide may be limited and since the carbon dioxide is usually not entirely converted to carbon monoxide when passed over the deactivated catalyst at elevated temperatures, in which case the exit gas from the regeneration zone contains a high percentage of carbon dioxide, it is preferable to recycle the gas within the process.

The process of my invention may be effected in any suitable type of apparatus. It is preferable to regenerate the catalyst in place but regardless of where the regeneration is effected means should be provided for uniformly contacting the catalyst with the carbon dioxide to insure uniform reactivation. Provision should also be made to uniformly heat the catalyst to the desired reactivation temperature again to insure even reactivation of the catalyst and at the same time to prevent the occurrence of local overheating which may destroy the activity of the catalyst. The following example is introduced to further illustrate the novelty and utility of the present invention but not with the intention of unduly limiting the same.

EXAMPLE I

A sample of catalyst comprising alumina, 0.3% platinum and 0.3% fluorine which was used in a commercial plant for the reforming of naphthas having boiling ranges of approximately 200° F. to 400° F. was subjected to various tests to determine the activity of the catalyst. The catalyst was used in the commercial reforming operation for approximately seven months. According to the procedure of testing this sample of catalyst, a 200–400° F. naphtha having an F-1 clear octane number of 34.2 and a F-1+3 cc. TEL/gal. octane number of 6.18 was passed over this catalyst at a block temperature of 883° F., a pressure of 500 p. s. i. g., a liquid hourly space velocity of 2.0 and in the presence of hydrogen at a mole ratio of 3.1 moles of hydrogen per mole of hydrocarbon. The average catalyst temperature used in this reforming operation was about 860° F. An analysis of the product showed an F–1 clear octane number of 71.4 and an F–1+3 cc. TEL/gal. of 89.4. The percent of 212° F. in the Engler distillation was 17.3 and the dispersion was 101.1. The percentage of carbon on the sample of catalyst was analyzed at 1.99%. These operating conditions as well as the analyses of the product from this reforming operation are shown in Table I under the heading of "As Received" which represents the catalyst that was removed from the commercial plant:

Table 1

| Operating Conditions | As Rec'd | $CO_2$ Regen. @ 1,015° F., 24 Hrs. | $CO_2$ Regen. @ 1,200° F., 24 Hrs. | Fresh Catalyst |
|---|---|---|---|---|
| Block Temp., °F | 883 | 886 | 892 | 893 |
| Average Catalyst Temp., °F | 861 | 860 | 860 | 860 |
| Pressure, p. s. i. g | 500 | 500 | 500 | 500 |
| Hourly liquid space velocity | 2.0 | 2.0 | 2.0 | 2.0 |
| Hydrogen/Hydrocarbon Mole Ratio | 3.1 | 3.2 | 3.0 | 3.1 |
| Liquid Product: | | | | |
| Reid Vapor Pressure | 3.6 | 2.6 | 3.5 | 3.4 |
| Percent over at 212° F | 17.3 | 13.3 | 14.3 | 16.6 |
| Specific Dispersion | 101.1 | 104.4 | 109.8 | 110.7 |
| Octane Nos.: | | | | |
| F–1 Clear | 75.4 | 77.4 | 84.4 | 84.6 |
| F–1+3 cc. TEL/gal | 89.4 | 91.0 | 92.8 | 94.4 |
| F–2 Clear | 71.0 | 72.7 | 76.1 | 77.4 |
| F–2+3 cc. TEL/gal | 85.0 | 85.0 | 85.5 | 86.6 |
| Carbon on catalyst after regeneration, wt. percent | 1.99 | 1.85 | 1.13 | 0.0 |

Another portion of the original sample of catalyst was subjected to carbon dioxide at a velocity of approximately 15 ft./sec., at a temperature of 1015° F. for a period of 24 hours. After this regeneration by carbon dioxide the catalyst was subjected to the test at approximately the same conditions as used for testing the other catalyst and the operating conditions and analysis of the product resulting from these tests are shown in Table I under the heading "$CO_2$ Regen. @ 1015° F., 24 hrs." The specific dispersion is an indication of the aromatizing power of the catalyst as a decrease in the specific dispersion shows that the activity of the catalyst for producing aromatics has decreased.

Another portion of the original sample of catalyst was subjected to treatment with carbon dioxide at a velocity of 15 ft./sec., at a temperature of 1200° F. for a period of 24 hours. The carbon content of the catalyst after being subjected to the regeneration was analyzed at 1.13 weight per cent which is appreciably lower than the carbon content of the catalyst after regeneration by any of the aforementioned methods. The regenerated catalyst was again subjected to testing at approximately the same conditions as the other catalysts of this example and the operating conditions and analyses of the product resulting from this reforming or testing operation are represented in Table I under the heading "$CO_2$ Regen. @ 1200° F., 24 hr."

A sample of fresh catalyst was also used in the reforming tests to be used as a comparison to determine to what extent the catalyst has been reactivated and the operating conditions at which the fresh catalyst was tested and the results of the analyses of the product resulting from the testing are represented in Table I under the heading of "Fresh Catalyst." By comparing the activity of the regenerated catalysts, it is evident that the process of my invention which incorporates treating and activating catalysts with carbon dioxide at a temperature of approximately 1100° F. to about 1400° F. is a superior method of regeneration. This is shown by the fact that the specific dispersion which is an indication of the aromatizing power of the catalyst in the tests performed on the catalyst regenerated according to the process of my invention is approximately the same as the specific dispersion of the product resulting from testing fresh catalyst and, therefore, the aromatizing power of the catalyst has been substantially restored.

I claim as my invention:

1. A method for the regeneration of a deactivated aromatizing catalyst containing a metal of group VIII of the periodic table, which comprises contacting said catalyst with a substantially oxygen-free regenerating gas comprising essentially carbon dioxide as its active component at a temperature above 1100° F. to about 1400° F. and for a sufficient period of time to substantially restore the aromatizing activity of the catalyst.

2. A method for the regeneration of a deactivated platinum-containing aromatizing catalyst which comprises contacting said catalyst with a substantially oxygen-free regenerating gas comprising essentially carbon dioxide as its active component at a temperature above 1100° F. to about 1400° F. and for a sufficient period of time to substantially restore the aromatizing activity of the catalyst.

3. The method of claim 1 further characterized in that said catalyst comprises platinum and alumina.

4. A method for reactivating a platinum-alumina-halogen catalyst of reduced aromatizing activity as a result of its prolonged use in gasoline reforming, which comprises contacting said catalyst with a substantially oxygen-free regenerating gas comprising essentially carbon dioxide as its active component at a temperature above 1100° F. to about 1400° F. and for a sufficient period of time to substantially restore the aromatizing activity of the catalyst.

References Cited in the file of this patent

UNITED STATES PATENTS

| 2,464,532 | Sellers | Mar. 15, 1949 |
| 2,609,345 | Easly et al. | Sept. 2, 1952 |
| 2,636,011 | Clark | Apr. 21, 1953 |
| 2,664,404 | Blatz | Dec. 29, 1953 |